United States Patent
Fukagawa et al.

(10) Patent No.: US 9,644,083 B2
(45) Date of Patent: May 9, 2017

(54) CELLULOSE ACYLATE FILM, POLARIZING PLATE PROTECTIVE FILM, POLARIZING PLATE AND LIQUID CRYSTAL DISPLAY USING THE SAME

(71) Applicant: FUJIFILM Corporation, Tokyo (JP)

(72) Inventors: Nobutaka Fukagawa, Kanagawa (JP); Yu Naito, Kanagawa (JP); Mayumi Nojiri, Kanagawa (JP); Hiroyuki Hagio, Kanagawa (JP); Aiko Yoshida, Kanagawa (JP); Hideyuki Nishikawa, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/633,868

(22) Filed: Feb. 27, 2015

(65) Prior Publication Data
US 2015/0252178 A1    Sep. 10, 2015

(30) Foreign Application Priority Data

Mar. 5, 2014 (JP) .................................. 2014-043365

(51) Int. Cl.
| | | |
|---|---|---|
| C08L 1/12 | (2006.01) | |
| C08J 5/18 | (2006.01) | |
| G02F 1/1335 | (2006.01) | |

(52) U.S. Cl.
CPC . *C08L 1/12* (2013.01); *C08J 5/18* (2013.01); *B32B 2457/202* (2013.01);
(Continued)

(58) Field of Classification Search
None
See application file for complete search history.

(56) References Cited

U.S. PATENT DOCUMENTS

| | | | |
|---|---|---|---|
| 2002/0192397 A1* | 12/2002 | Tsujimoto | 428/1.31 |
| 2005/0187385 A1* | 8/2005 | Nakano | C08B 3/06 536/76 |

(Continued)

FOREIGN PATENT DOCUMENTS

| | | |
|---|---|---|
| JP | 05-197073 A | 8/1993 |
| JP | 2002-128900 A | 5/2002 |

(Continued)

OTHER PUBLICATIONS

Office Action, issued by the Japanese Patent Office (JPO) on Oct. 18, 2016, in connection with corresponding Japanese Patent Application No. 2014-043365.

*Primary Examiner* — Anthony J Frost
(74) *Attorney, Agent, or Firm* — Jean C. Edwards, Esq.; Edwards Neils LLC

(57) ABSTRACT

A cellulose acylate film, containing: at least two or more of chelating agents having different pKa values from one another, wherein the chelating agents comprise: a chelating agent A having at least one functional group whose acid dissociation constant pKa, measured at 25° C. in a mixed solvent having a mixing ratio of tetrahydrofuran 60 ml/water 40 ml, is 6 or less; and a chelating agent B having at least one functional group of a conjugate acid whose pKa, measured at the same condition, is 7 or more; and a cellulose acylate, and wherein the number of bright spots of the cellulose acylate film is equal to or less than 500/cm$^2$; a polarizing plate protective film, a polarizing plate and a liquid crystal display using the same.

9 Claims, 2 Drawing Sheets

(52) U.S. Cl.
CPC ..... *C08J 2301/12* (2013.01); *G02F 1/133528* (2013.01); *Y10T 428/105* (2015.01); *Y10T 428/31971* (2015.04)

(56) References Cited

U.S. PATENT DOCUMENTS

2007/0134446 A1\* 6/2007 Inagaki .................. B29C 41/28
                                                              428/1.31
2011/0223435 A1    9/2011 Naito et al.

FOREIGN PATENT DOCUMENTS

| JP | 2011-118135 A |   | 6/2011 |
|----|---------------|---|--------|
| JP | 2011118135 A  | * | 6/2011 |
| JP | 2012-072348 A |   | 4/2012 |
| JP | 2013-025013 A |   | 2/2013 |
| JP | 2013-117560 A |   | 6/2013 |
| JP | 2013-174851 A |   | 9/2013 |
| JP | 2013210561 A  | * | 10/2013 |

\* cited by examiner

CELLULOSE ACYLATE FILM, POLARIZING PLATE PROTECTIVE FILM, POLARIZING PLATE AND LIQUID CRYSTAL DISPLAY USING THE SAME

CROSS-REFERENCE TO RELATED APPLICATION

This non-provisional application claims priority under 35 U.S.C. §119 (a) on Patent Application No. 2014-043365 filed in Japan on Mar. 5, 2014, which is entirely herein incorporated by reference.

TECHNICAL FIELD

The present invention relates to a cellulose acylate film, a polarizing plate protective film, a polarizing plate and a liquid crystal display using the same.

BACKGROUND ART

Cellulose acylate films are used for various liquid crystal displays, as optical elements thereof, such as supports for optical compensation films, and protective films for polarizing plates.

In addition to an indoor use of the liquid crystal display, such as a TV use, a chance of the outdoor use thereof is increased, for example, use as a mobile device. As a result, development of a liquid crystal display is required, which is impervious to the use under the conditions of higher temperature and higher humidity than ever before. However, when the liquid crystal display is used under the conditions of higher temperature and higher humidity, there is a problem of deterioration of display performance due to occurrence of unevenness or lowering in polarization performance, each of which is caused by contraction of the polarizer. Further, in the liquid crystal display, a demand for durability in a wide array of uses and under extreme use condition has been increasing, and year after year a higher level of durability than before has been required. Further, more improvement in these performances has been required as a result of making a liquid crystal display thinner in recent years.

Patent Literature 1 describes that durability of the polarizer under the conditions of higher temperature and higher humidity can be improved, by a resin film (including a cellulose acylate film) containing an organic acid with acid dissociation constant of from 2 to 7 in a particular solvent. Further, Patent Literature 2 proposes to suppress retardation developing property and internal haze, by a chelating agent whose chelate constant (chelate stability constant) with $Ca^{2+}$ ions is 2 or more.

CITATION LIST

Patent Literature

Patent Literature 1: JP-A-2011-118135 ("JP-A" means unexamined published Japanese patent application)
Patent Literature 2: JP-A-2013-25013

Technical Problem

The present invention is contemplated for providing: a cellulose acylate films in which generation of both foreign substances and bright spots has been suppressed by deactivating a tiny amount of metal ions, such as $Ca^{2+}$ ions and $Mg^{2+}$ ions, which are mixed in a dope, in the production of the cellulose acylate film, and variation of film thickness due to heat and humidity aging is less, and durability is excellent; protective films for polarizing plates; and polarizing plates and liquid crystal displays using the same, respectively.

Solution to Problem

Research by the present inventors revealed that an aliphatic or aromatic monocarboxylic acid has a low inhibitory effect on formation of foreign substance caused by agglomeration of cellulose, due to polyvalent metal ion incorporation, such as $Ca^{2+}$ ions and $Mg^{2+}$ ions. Further, the research revealed that a chelating agent having a plurality of carboxymethylamino groups, such as imimodiacetic acid, nitrilotriacetic acid, ethylenediaminedipropionic acid, diethylenetriaminepentaacetic acid, and the like, has a high chelate constant with $Ca^{2+}$ ions, whereas it has a low solubility in an organic solvent, such as methylene chloride, methanol, and the like, which is used in production of cellulose acylate films. As a result of a study, the present inventors found that in the case where these chelating agents are contained in the cellulose acylate film, even though the agglomeration of cellulose is suppressed, the chelating agent itself deposits to cause a foreign substance, and also such a chelating agent having a high chelate constant with $Ca^{2+}$ ions has a large variation of the film thickness with heat and humidity aging.

On the one hand, as a result of the study, the present inventors found that the chelating agent having a high solubility in an organic solvent, such as methylene chloride, methanol, and the like, has a low effect on deactivation of the polyvalent metal ion.

As a result of various studies based on the above findings, the present inventors have found that there is a possibility that the above problem can be resolved, by using chelating agents each having a different pKa value from one another in combination. The present invention has been attained by further studies.

According to the present invention, there is provided the following means:

<1> A cellulose acylate film, comprising: at least two or more of chelating agents having different pKa values from one another, wherein the chelating agents comprise: a chelating agent A having at least one functional group whose acid dissociation constant pKa, measured at 25° C. in a mixed solvent having a mixing ratio of tetrahydrofuran 60 ml/water 40 ml, is 6 or less; and a chelating agent B having at least one functional group of a conjugate acid whose pKa, measured at the same condition, is 7 or more; and a cellulose acylate, and wherein the number of bright spots of the cellulose acylate film is equal to or less than 500/cm².

<2> The cellulose acylate film described in the item <1>, wherein the chelating agent A contains a functional group selected from a phosphonic acid group, a carboxylic acid group, and a sulfonic acid group.

<3> The cellulose acylate film described in the item <1> or <2>, wherein the chelating agent B contains a functional group selected from an amino group and an imino group.

<4> A polarizing plate protective film, containing the cellulose acylate film described in any one of the items <1> to <3>.

<5> A polarizing plate, containing: at least the polarizing plate protective film described in the item <4>; and a polarizer.

<6> A liquid crystal display, containing: at least the polarizing plate described in the item <5>; and a liquid crystal cell.

Note that, in this patent specification, any numerical expressions in a style of " . . . to . . . " will be used to indicate a range including the lower and upper limits represented by the numerals given before and after "to", respectively.

Further, in this patent specification, the term "group" which is explained about each group is used in a sense such that any of the aspect having no substituent and the aspect having a substituent is incorporated therein, unless otherwise indicated. For example, the term "alkyl group" means an alkyl group which may have a substituent. Further, in this patent specification, the term "aliphatic group" may be a straight chain, branched, or cyclic aliphatic group which may be saturated or unsaturated (except that it results in an aromatic ring).

When a plurality of substituents, linking groups or the like (hereinafter, referred to as "substituent or the like") are simultaneously or alternatively defined herein, respective substituents or the like may be identical or different.

Advantageous Effects of Invention

The present invention allows for providing: cellulose acylate films, in which generation of foreign substances is suppressed, the number of bright spots is lessened, variation of film thickness with heat and humidity aging is lessened, and durability is excellent; protective films for polarizing plates; and polarizing plates, and liquid crystal displays, each using the cellulose acylate films, respectively.

DETAILED DESCRIPTION OF THE INVENTION

Figure 1:
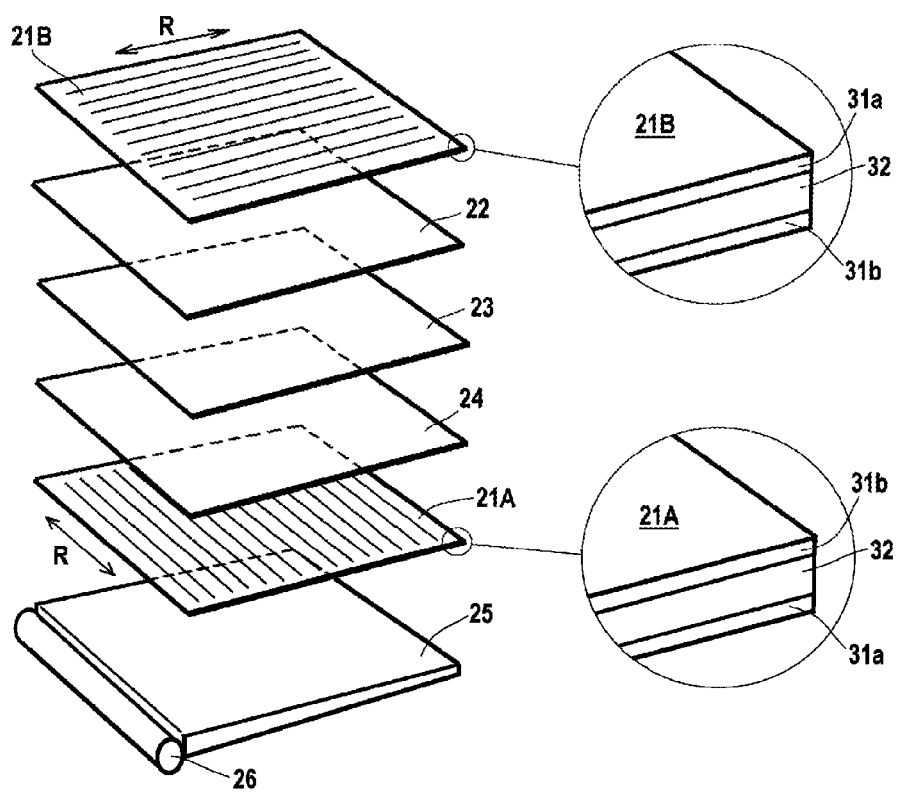
FIG. 1 is an example of an exploded perspective view diagrammatically showing an internal structure of the liquid crystal display.

Hereinafter, the present invention is described in detail referring to the embodiments.
<<Cellulose Acylate Film>>

The cellulose acylate film of the present invention contains at least two or more of chelating agents having different pKa values from one another, and the number of bright spots of the cellulose acylate film is equal to or less than 500 per 1 $cm^2$.

The cellulose acylate film of the present invention is suitable for use as a protective film for a polarizing plate.
<The Number of Bright Spots>

As shown in Examples given below, the number of bright spots of the cellulose acylate film is calculated by arranging two sheets of polarizing plates in a cross-nicol alignment, inserting a cellulose acylate film between them, and then observing it under a polarizing microscope (objective lens× 50 times), to measure the number of bright spots per 1 $cm^2$. The number of bright spots is preferably equal to or less than 500 per 1 $cm^2$, more preferably equal to or less than 450 per 1 $cm^2$, and still more preferably equal to or less than 300 per 1 $cm^2$. The lower limit is not limited in particular, but 10 or more per 1 $cm^2$ in practice.

Occurrence of bright spots can be deduced, by containing a chelating agent having a large chelate constant into a cellulose acylate film, to deactivate metal ions and thereby suppressing agglomeration of cellulose acylate. Further, generation of foreign substance is decreased, because solubility of the chelating agent in a solvent for film formation is improved, by using chelating agents having different pKa values from one another in combination to form an organic salt. As a result, the number of bright spots can be controlled to the above range.
<Chelating Agent Having a Functional Group Whose Acid Dissociation Constant pKa of 6 or Less>

The cellulose acylate film of the present invention contains at least two chelating agents. One of the two chelating agents is a chelating agent having a large pKa and, in the present invention, such is a chelating agent (chelating agent A) having at least one functional group whose acid dissociation constant pKa measured at 25° C. in a mixed solvent having a mixing ratio of tetrahydrofuran 60 ml/water 40 ml is 6 or less.

The acid dissociation constant pKa can be measured in accordance with an alkali titration method described in Experimental Chemistry Course, 2nd Ed., pp. 215-217, published by MARUZEN PUBLISHING CO., LTD.

The chelating agent A having at least one functional group with acid dissociation constant pKa of 6 or less may be any compound, as long as it has at least one functional group with acid dissociation constant pKa of 6 or less.

The functional group with acid dissociation constant pKa of 6 or less may be its salt, but the functional group which is not its salt is preferable because of combination use with a chelating agent B having a conjugated acid whose pKa is high.

As a result, for example, in the case of using a commercially available chelating agent which is a salt of the functional group whose acid dissociation constant pKa is 6 or less, it is preferable that the salt is changed to an educt (a functional group which is not a salt) with hydrochloric acid or sulfuric acid once before use.

Herein, in the case where the functional group whose acid dissociation constant pKa is 6 or less is a salt thereof, it may be an inorganic or organic salt. As for the inorganic salt, a salt of an alkali metal, such as potassium and sodium, is preferable. As for the organic salt, a quaternary ammonium salt, for example, a quaternary ammonium salt whose nitrogen atom is substituted with a group selected from an alkyl group and an aryl group, such as a tetramethylammonium salt, is preferable.

Examples of the functional group whose acid dissociation constant pKa is 6 or less include a phosphonic acid group [—P(═O)(OH)$_2$], a phosphinic acid group [—P(═O)OH], a phosphoric acid group [—O—P(═O)(OH)$_2$], a carboxylic acid group [—CO$_2$H], and a sulfonic acid group [—SO$_3$H], and preferably a phosphonic acid group, a carboxylic acid group and a sulfonic acid group, more preferably a phosphonic acid group and a carboxylic acid group, and still more preferably a phosphonic acid group.

It is preferable for the compound to have from 2 to 4 functional groups whose acid dissociation constant pKa is 6 or less.

The chelating agent having a phosphonic acid group include tripolyphosphoric acid, pyrophosphoric acid, metaphosphoric acid, hexametaphosphoric acid, ammonia-N,N, N-tris(methylene phosphonic acid), ethylenediamine-N,N, N',N'-tetrakis(methylene phosphonic acid), ethylenediamine-tetra(methylene phosphonic acid), diethylenetriamine-penta(methylene phosphonic acid), iminodialkylphosphonic acid, such as iminodimethylphosphonic acid, hydroxyalkylidenediphosphonic acid, such as 1-hydroxyethylidene-1,1-diphosphonic acid, or their salts.

As for these chelating agents, commercially available products may also be used, and examples thereof include 1-hydroxyethane-1,1-diphosphonic acid (trade name: F-115, manufactured by Yokkaichi Chemical Company, Limited.), ammonia-N,N,N-tris(methylene phosphonic acid) (trade name: CHELEST PH-320, manufactured by Chelest Corporation), ethylenediamine-N,N,N',N'-tetrakis(methylene phosphonic acid) (trade name: CHELEST PH-540, manufactured by Chelest Corporation), and sodium hydroxyethanediphosphonate (trade name: BRIQUEST ADPA-60SH, manufactured by Rhodia).

Examples of the chelating agent having a carboxylic acid group include ethylenediaminetetraacetic acid, hydroxyethylethylenediaminetriacetic acid, diethylenetriaminepentaacetic acid, nitrilotriacetic acid, triethylenetetraminehexaacetic acid, cyclohexanediaminetetraacetic acid, hydroxyethyliminodiacetic acid, ethyleneglycol-bis(2-aminoethyl ether)tetraacetic acid, 1,3-diaminopropanetetraacetic acid, ethylenediamine-di(o-hydroxyphenylacetic acid), DL-alanine-N,N-diacetic acid, asparagine acid-N,N-diacetic acid, glutamic acid-N,N-diacetic acid, serine-N,N-diacetic acid, polyacrylic acid, isoamilene/maleic acid copolymer, acrylic acid/maleic acid copolymer, acrylic acid/(meth)acrylic acid copolymer, silicic acid, gluconic acid, hydroxybenzyliminodiacetic acid, iminodiacetic acid, and L-ascorbic acid, such as L-ascorbic acid palmitic acid ester.

As a commercially available product, it is possible to use diethylenetriaminepentaacetic acid (trade name: TAKURAN DO, manufactured by Nagase ChemteX Corporation), CHELEST MZ-2, CHELEST MZ-8 (trade names, manufactured by Chelest Corporation), POEM K-37V (trade name, manufactured by Riken Vitamin Co., Ltd.), and L-ascorbic acid palmitic acid ester (manufactured by Watanabe Chemical Co., Ltd.).

Examples of the chelating agent having a sulfonic acid group include lignin sulfonic acid salt, tropolone-5-sulfonic acid, a chelate resin having a methyleneaminoethylsulfonic acid group, sodium 2,3-dimercaptopropane-1-sulfonate, acrylamide/t-butyl sulfonic acid, and catechol/4-sulfonic acid.

The chelating agent A having at least one functional group whose acid dissociation constant pKa is 6 or less is preferably contained in an amount of from 0.00001 to 1.0 part by mass, more preferably from 0.0001 to 0.5 parts by mass, and still more preferably from 0.001 to 0.1 parts by mass, with respect to 100 parts by mass of cellulose acylate, although the content thereof depends on the number of functional groups with acid dissociation constant pKa of 6 or less.

<Chelating Agent Having a Functional Group of a Conjugate Acid, Whose pKa of 7 or More>

At least one residual chelating agent of the at least two chelating agents which the cellulose acylate film of the present invention contains, is a chelating agent B having at least one functional group of a conjugate acid, whose pKa measured at 25° C. in a mixed solvent having a mixing ratio of tetrahydrofuran 60 ml/water 40 ml, is 7 or more.

The functional group is not limited in particular, as long as pKa of the conjugate acid is 7 or more. Examples of the functional group include: a heterocyclic group in which the hetero ring is pyridine, pyrimidine, or the like; an amino group; and an imino group. In the present invention, an amino group is preferable. As for the amino group, an amino group ($-NH_2$) and an amino group in which a nitrogen atom is substituted with a group selected from an alkyl group and an aryl group, namely an alkylamino group, a dialkylamino group, a N-alkyl-N-arylamino group, and a diarylamino group are preferable.

Further, in the case where the functional group of the conjugate acid whose pKa is 7 or more is an imino group, polyalkyleneimines, such as polyethyleneimine, N-hydroxypropylpolyethyleneimine, and the like, are preferable. As for the polyalkyleneimine, those in which an alkyl group is substituted on N, like N-hydroxypropylpolyethyleneimine, are also preferable. The alkyl group may have a substituent, and an alkyl group on which a hydroxy group is substituted is also preferable.

It is preferable for the compound to have from 2 to 4 functional groups of the conjugate acid whose pKa is 7 or more.

Of the chelating agent having a functional group of a conjugate acid whose pKa is 7 or more, examples of the chelating agent B having such an amino group include: a mono-, di-, or tri-alkylamine compound, such as monoethanolamine, diethanolamine, triethanolamine, monoisopropanolamine, diisopropanolamine, triisopropanolamine, and tri (n-octyl)amine; and a multivalent alkylamino compound, and further include: N,N-dialkyl-N-acylamino compound, such as N,N-di(n-octyl)-N-phenylamine; N-alkyl-N,N-diarylamine compound, such as N-(n-octyl)-N,N-diphenylamine; and N,N,N-triarylamine compound, such as N,N,N-triphenylamine.

As for the alkyl group with which the nitrogen atom is substituted, a substituted alkyl group in which the alkyl group is substituted with a hydroxy group, for example, a hydroxyethyl group, is also preferable.

Not only compounds having one amino group as mentioned above, but also multivalent amine compounds having 2 or more amino groups are preferable. Examples thereof include ethylenediamine, N,N,N',N'-tetramethylethylenediamine, tetraethylenepentamine, triethylenetetramine, and N,N,N',N'',N''-pentakis(2-hydroxypropyl)diethylenetriamine.

These monovalent or multivalent amine compounds or monovalent or multivalent imine compounds are marketed from, for example, Tokyo Chemical Industry Co., Ltd., NOF CORPORATION, and NIPPON SHOKUBAI CO., LTD. Examples thereof include NAIMEAN L-202 (trade name: manufactured by NOF CORPORATION, N,N-di(hydroxyethyl)laurylamine), EPOMINE SP-006 (trade name: manufactured by NIPPON SHOKUBAI CO., LTD., polyethyleneimine, average molecular weight: 600), and EPOMINE PP-061 (trade name: manufactured by NIPPON SHOKUBAI CO., LTD., N-hydroxypropylpolyethyleneimine, average molecular weight abut 1,400).

As for the chelating agents A and B, in addition to the above compounds, it is possible to use compounds described in each of the publications of JP-B-6-8956 ("JP-B" means examined Japanese patent publication), JP-A-11-190892, JP-A-2000-18038, JP-A-2010-158640, JP-A-2006-328203, JP-A-2005-68246, and JP-A-2006-306969.

In the chelating agent B having at least one functional group of a conjugate acid whose pKa is 7 or more, the number of functional groups in the molecule thereof is preferably from 0.80 to 1.20 times, more preferably from 0.85 to 1.15 times, and still more preferably from 0.90 to 1.10 times, with respect to the number of functional groups whose pKa is 6 or less in the molecule of the chelating agent A having at least one functional group whose acid dissociation constant pKa is 6 or less.

In the case where the above functional group(s) in the molecule does not fall within the above-described preferable range, use amounts of the chelating agents A and B may be controlled in the total use amount of the chelating agents to be combined so that a relationship between the total number of functional groups of the conjugate acid whose pKa is 7 or more and the total number of functional groups whose acid dissociation constant pKa is 6 or less becomes the above-described preferable range.

The solubility of chelating agents composed of a mixture of the chelating agent A having at least one functional group whose pKa is 6 or less and the chelating agent B having at least one functional group of the conjugate acid whose pKa is 7 or more, in methylene chloride at 25° C., is preferably from 0.01 to 50 parts by mass, more preferably from 0.05 to 30 parts by mass, and still preferably from 0.1 to 20 parts by mass, with respect to 100 parts by mass of methylene chloride.

A mixing method of the chelating agents is not limited in particular, as long as at least one chelating agent A and at least one chelating agent B are contained in a finally produced cellulose acylate film.

For example, the chelating agent A and the chelating agent B may be contained in a dope at the same step, or each chelating agent may be added respectively in a different step from one another.

The cellulose acylate film containing the above chelating agent A and chelating agent B allows suppression of change in film thickness before and after heat and humidity aging. Although details of this mechanism are not clear, the present inventors suppose that agglomeration of cellulose acylate and deposition of the chelating agent can be suppressed by the present invention, and as a result, it is possible to suppress a phenomenon that as a result of long-term exposure under conditions of high temperature and high humidity, moisture gets through the inner part of the polymer chain of cellulose acylate agglomerated by metal ion and resultantly the agglomerated portion is swollen, or a phenomenon that a chelating agent is deposited on a surface of the cellulose acylate film and resultantly a surface state is deteriorated.

<Cellulose Acylate>

In the present invention, cellulose acylate is used as a main component of the cellulose acylate film. One cellulose acylate may be used, or alternatively two or more thereof may be used in combination. The cellulose acylate may be a cellulose acylate having, for example, only an acetyl group as the acyl substituent thereof. Alternatively, a cellulose acylate having a plurality of different acyl substituents as the acyl substituent thereof may be used. The cellulose acylate may be a mixture of cellulose acylates that are different from one another.

The cellulose material for cellulose acylate which is used in the present invention includes cotton liter and wood pulp (hardwood pulp, softwood pulp), and cellulose acylate obtained from any of such a cellulose material are usable herein. Those cellulose materials may be mixed for use herein. The cellulose materials are described in detail, for example, in Marusawa & Uda's "Plastic Material Lecture (17), Cellulose Resin" by Nikkan Kogyo Shinbun (1970) and Hatsumei Kyokai's Disclosure Bulletin 2001-1745 (pp. 7-8), and those celluloses described therein may be usable herein.

In the present specification, the acyl group of the cellulose acylate may be one acyl group, or two or more acyl groups.

It is preferable that the cellulose acylate to be used in the present invention has an acyl group having 2 or greater carbon atoms as a substituent. The acyl group having 2 or greater carbon atoms is not particularly limited, such that it may be an aliphatic acyl group or an aromatic acyl group. Examples thereof include cellulosic alkylcarbonyl ester groups, alkenylcarbonyl ester groups, aromatic carbonyl ester groups, and aromatic alkylcarbonyl ester groups, each of which may have a substituted group. Preferable examples thereof include acetyl, propionyl, butanoyl, heptanoyl, hexanoyl, octanoyl, decanoyl, dodecanoyl, tridecanoyl, tetradecanoyl, hexadecanoyl, octadecanoyl, isobutanoyl, tert-butanoyl, cyclohexane carbonyl, oleoyl, benzoyl, naphthylcarbonyl, and cinnamoyl. Among these, more preferred are acetyl, propionyl, butanoyl, decanoyl, octadecanoyl, tert-butanoyl, oleoyl, benzoyl, naphthyl carbonyl, cinnamoyl, and the like. Further preferred are acetyl, propionyl and butanoyl.

It is preferable that the cellulose acylate to be used in the present invention has an acyl group having 2 to 4 carbon atoms as a substituent. When two or more acyl groups are used, it is preferable that one kind of the acyl groups is an acetyl group and another kind of the acyl group having 2 to 4 carbon atoms is preferably propionyl group or butyryl group. By use of these cellulose acylates, a solution with a good solubility can be prepared. Especially in a non-chlorine organic solvent, preparation of a good solution becomes possible with these cellulose acylates. Further, preparation of a solution having a low viscosity and a good filterability becomes possible.

In the present invention, it is especially preferable that the cellulose acylate has an acetyl group only as an acyl group, from the viewpoint of effectively exhibiting effects owing to the chelating agents A and B according to the present invention.

Hereinafter, cellulose acylate to be preferably used in the present invention is described in detail.

The glucose unit having β-1,4 bonds which constitutes cellulose has free hydroxy groups at the 2-, 3-, and 6-positions thereof. The cellulose acylate is a polymeric substance (polymer) in which a part of or all of these hydroxy groups is or are acylated.

The acyl substitution degree indicates a degree of acylation of the hydroxy groups located at the 2-, 3-, and 6-positions of cellulose. When each of the hydroxy groups at the 2-, 3-, and 6-positions of all of the glucose units is acylated, the total acyl substitution degree is 3. For example, when each of the hydroxy groups only at the 6-position of all of the glucose units is acylated, the total acyl substitution degree is 1. In the same manner, even if each of the hydroxy groups at either the 6-position or the 2-position of the entire glucose unit is acylated, the total acyl substitution degree is 1.

That is to say, the acyl substitution degree indicates a degree of acylation, provided that when all of the hydroxy groups of the glucose molecule are entirely acylated, the acyl substitution degree is 3.

The details of the measurement method of the acyl substitution degree are described in Tezuka et al. (Carbohydrate, Res., 273 (1995) p. 83 to 91). The acyl substitution degree can be determined according to the method defined in ASTM-D817-96.

When the total acyl substitution degree of the cellulose acylate to be used in the present invention is A, A is preferably from 1.5 to 3.0 (1.5≤A≤3.0), more preferably from 2.00 to 2.97, still further preferably from 2.50 to less than 2.97, and particularly preferably from 2.70 to 2.95.

When the acyl group of the cellulose acylate to be used in the present invention is only an acetyl group, if we take the total acetyl substitution degree is B, B is preferably from 2.0 to 3.0 (2.0≤B≤3.0), more preferably from 2.0 to 2.97, still more preferably from 2.5 to less than 2.97, especially preferably from 2.55 to less than 2.97, more specially preferably from 2.60 to 2.96, and particularly preferably from 2.70 to 2.95.

In the present specification, the effects of the chelating agents A and B are exerted particularly with respect to the cellulose acylate in which A that is the total degree of acyl substitution is more than 2.00.

In the case where the cellulose acylate film of the optical film of the present invention is a laminate (multilayer configuration), the degree of acyl group substitution of the cellulose acylate in each layer may be uniform or a plurality of cellulose acrylates which have different degrees of acyl group substitution or different acyl groups may be present in one layer in a mixed manner in the cellulose acylate film.

In the case where an acid anhydride or an acid chloride is used as an acylating agent in acylation of the cellulose, methylene chloride or an organic acid, for example, acetic acid and the like, is used as an organic solvent which acts as a reaction solvent.

As for the catalyst, when the acylating agent is an acid anhydride, a protic catalyst, such as sulfuric acid, is preferably used. While, when the acylating agent is an acid chloride (for example, $CH_3CH_2COCl$), a basic compound is used as the catalyst.

A most common industrial method for the synthesis of a mixed fatty acid ester of cellulose is a method of acylating cellulose with a mixed organic acid component that includes fatty acids corresponding to an acetyl group and to any other acyl group (e.g. acetic acid, propionic acid, valeric acid) or their acid anhydrides.

The cellulose acylate may be produced, for example, according to the method described in JP-A-10-45804.

The film of the present invention contains the cellulose acylate, especially the cellulose acylate film to be used in the present invention in the proportion of preferably from 5 to 99% by mass, more preferably from 20 to 99% by mass, and particularly preferably from 50 to 95% by mass, with respect to the total solid content of the film, from the viewpoint of water-vapor transmission ratio.

[Other Additives]

To the cellulose acylate film of the present invention, a barbituric acid compound as described in for example JP-A-2011-118135, a retardation-controlling agent (retardation-developing agent and retardation-reducing agent), and as a plasticizer, a polycondensation ester compound (polymer), and a polyvalent ester of polyvalent alcohol, for example, a phthalic acid ester, a phosphoric acid ester, sugar ester and the like, and further additives, such as a ultraviolet absorber, an antioxidant, and a matting agent may be added, along with the chelating agents A and B.

In the present specification, when compounds are described, they may be described incorporating therein the expression"-based", for example, like a phosphoric acid ester-based compound. However, in this case, this means the same as the phosphoric acid ester compound.

As for the retardation-reducing agent, the retardation-developing agent, the plasticizer, the hydrophobizing agent including polyalcohol ester-based one and polycondensation ester-based one, the hydrocarbon derivative-based plasticizer, the antioxidant, the ultraviolet absorber, and the matting agent, such the compounds and materials described in JP-A-2013-28782, paragraphs 0061 to 0126 are preferable, and a whole content including their contained amounts is preferably incorporated by reference as a part of the present specification.

(Barbituric Acid Compound)

In the present invention, the above chelating agent A and chelating agent B are preferably used together with a barbituric acid compound in combination.

By using in combination with the barbituric acid compound, durability of the polarizing plate is improved, and in addition, coloration of the film due to light is suppressed, and light-resistant adhesiveness is also improved.

The content of the barbituric acid compound is preferably 0.1 to 20 parts by mass, more preferably 0.2 to 15 mass parts, and particularly preferably 0.3 to 10 parts by mass, to 100 parts by mass of the cellulose acylate.

The barbituric acid compound is preferably a compound represented by formula (BA).

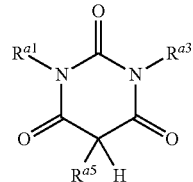

Formula (BA)

In formula (BA), $R^{a1}$, $R^{a3}$ and $R^{a5}$ each independently represent a hydrogen group, an alkyl group having 1 to 20 carbon atoms, a cycloalkyl group having 3 to 20 carbon atoms, an alkenyl group having 2 to 20 carbon atoms, or an aryl group having 6 to 20 carbon atoms. Herein, an alkyl group, a cycloalkyl group, an alkenyl group, and an aryl group may have a substituent.

The substituent, which each of the alkyl group, the cycloalkyl group, the alkenyl group, and the aryl group may have, includes a halogen atom, an alkyl group, an aryl group, an alkoxy group, an aryloxy group, an alkylthio group, an arylthio group, an acyl group, an alkoxycarbonyl group, an aryloxycarbonyl group, an amino group, an acylamino group, a sulfonamide group, a carbamoyl group, a sulfamoyl group, a sulfonyl group, a cyano group and the like.

In $R^{a1}$, $R^{a3}$ and $R^{a5}$, the carbon atom number of alkyl groups is preferably from 1 to 12, the carbon atom number of cycloalkyl groups is preferably from 5 to 12, the carbon atom number of alkenyl groups is preferably from 2 to 12, and the carbon atom number of aryl groups is preferably from 6 to 12. As for the cycloalkyl group, cyclopentyl group and cyclohexyl group are preferable. The aryl group includes a phenyl group and a naphthyl group, and a phenyl group which may have a substituent is preferable.

Any one of $R^{a1}$, $R^{a3}$ and $R^{a5}$ is preferably an aralkyl group or a cycloalkyl group. As for the aralkyl group, a benzyl group is preferable. As for the cycloalkyl group, a cyclopentyl group and cyclohexyl group are preferable, and a cyclohexyl group is more preferable.

The total number of ring structures existing in $R^{a1}$, $R^{a3}$ and $R^{a5}$ is preferably 3 or more. The ring of the ring structure includes an aromatic ring and an aliphatic ring. The carbon atom of these rings may be substituted with a hetero atom. As for the ring structure, a benzene ring, a naphthalene ring, a cyclopentane ring, and a cyclohexane ring are preferable, and a benzene ring and a cyclohexane ring are more preferable.

It is more preferable for each of $R^{a1}$, $R^{a3}$ and $R^{a5}$ to have one or more ring structures, and it is still more preferable for each of $R^{a1}$, $R^{a3}$ and $R^{a5}$ to have one ring structure.

The total number of ring structures is preferably 3 to 6, more preferably 3 or 4.

The molecular weight of the compound represented by formula (BA) is preferably 250 to 1,200, more preferably 300 to 800, particularly 350 to 600.

By setting the molecular weight to such a preferable range, a high-transparent film which is excellent in inhibiting volatilization of the compound to be used in the present invention from the film, can be obtained.

Hereinafter, the specific examples of the barbituric acid compound are described, but the present invention is not limited thereto.

Herein, Ph represents a phenyl group, cHex represents a cyclohexyl group, and $C_6H_4$ represents a phenylene group. The group expressed by ( ) like $C_6H_4$ (p-$CH_3$) represents a substituent onto the phenyl group. The expression "p-" indicates p-position.

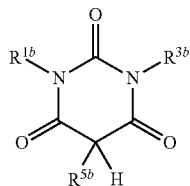

| Compound No. | $R^{1b}$ | $R^{3b}$ | $R^{5b}$ |
|---|---|---|---|
| BA-1 | Ph | $CH_2Ph$ | $CH_2Ph$ |
| BA-2 | H | $CH_2Ph$ | Ph |
| BA-3 | H | H | Ph |
| BA-4 | H | H | $CH_2Ph$ |
| BA-5 | H | H | $CHPh_2$ |
| BA-6 | H | H | $CH_2C_6H_4(p\text{-}CH_3)$ |
| BA-7 | H | H | $CH_2C_6H_4(p\text{-}OCH_3)$ |
| BA-8 | H | H | $CH_2C_6H_4(p\text{-}Cl)$ |
| BA-9 | $CH_3$ | $CH_3$ | Ph |
| BA-10 | $CH_3$ | $CH_3$ | $CH_2Ph$ |
| BA-11 | H | Ph | Ph |
| BA-12 | H | Ph | $CH_2Ph$ |
| BA-13 | H | $CH_2Ph$ | $CH_2Ph$ |
| BA-14 | H | $CHPh_2$ | Ph |
| BA-15 | H | cHex | cHex |
| BA-16 | Ph | Ph | Ph |
| BA-17 | Ph | Ph | $CH_2Ph$ |
| BA-18 | Ph | Ph | n-$C_4H_9$ |
| BA-19 | Ph | Ph | $CH(CH_3)Ph$ |
| BA-20 | Ph | $C_6H_4(p\text{-}CH_3)$ | Ph |
| BA-21 | Ph | $C_6H_4(p\text{-}OCH_3)$ | $CH_2Ph$ |
| BA-22 | Ph | $CH_2Ph$ | $CH_2CH_2Ph$ |
| BA-23 | Ph | $CH_2Ph$ | $CH_2Ph$ |
| BA-24 | cHex | cHex | Ph |
| BA-25 | cHex | cHex | $CH_2Ph$ |
| BA-26 | cHex | cHex | cHex |
| BA-27 | $CH_2Ph$ | $CH_2Ph$ | Ph |
| BA-28 | $CH_2Ph$ | $CH_2Ph$ | $CH_2Ph$ |
| BA-29 | $CH_2Ph$ | $CH_2Ph$ | n-$C_4H_9$ |
| BA-30 | Ph | Ph | $CH_2CH_2CN$ |
| BA-31 | Ph | Ph | $CH_2CH_2COOC_2H_5$ |
| BA-32 | Ph | $CH_2CH_2OCH_3$ | Ph |
| BA-33 | Ph | $CH_2CH_2COOC_2H_5$ | $CH_2Ph$ |
| BA-34 | Ph | $CH_2CH_2OH$ | $CH_2Ph$ |
| BA-35 | $CH_3$ | $CH_3$ | n-$C_4H_9$ |

It is known that the compound represented by formula (BA) can be synthesized using a barbituric acid synthesis method of subjecting a urea derivative and a malonic acid derivative to condensation. A barbituric acid which has two substituents on the nitrogen atoms can be obtained, by heating an N,N'-disubstituted urea together with malonic acid chloride or heating a combination of malonic acid and an activating agent, such as acetic anhydride. For example, methods can be used preferably, as described in Journal of the American Chemical Society, Vol. 61, page 1015 (1939), Journal of Medicinal Chemistry, Vol. 54, page 2409 (2011), Tetrahedron Letters, Vol. 40, page 8029 (1999), and International publication No. 2007/150011, and the like.

Further, the malonic acid to be used for condensation may not be substituted or may have a substituent. By subjecting an unsubstituted malonic acid and a urea derivative to condensation, a barbituric acid which is not substituted at 5-position thereof is obtained. As a result, by modifying the thus-obtained compound, various kinds of barbituric acid compounds may be synthesized.

(Radical Scavenger)

The cellulose acylate film preferably contains a radical scavenger. A HALS (hindered amine-based light stabilizer) and a reductone are preferably used as the radical scavenger.

The HALS is particularly preferably a compound having a 2,2,6,6-tetramethyl-piperidine ring, it is preferably a compound in which the 1-position of piperidine is a hydrogen atom, an alkyl group, an alkoxy group, a hydroxy group, an oxy radical group (—O.), an acyloxy group, or an acyl group, and it is more preferably a compound in which the 4-position thereof is a hydrogen atom, a hydroxy group, an acyloxy group, an amino group which may have a substituent, an alkoxy group, or an aryloxy group. In addition, it is also preferably a compound having from two to five 2,2,6,6-tetramethyl-piperidine rings in the molecule.

Examples of such a compound include Sunlizer HA-622 (trade name, manufactured by Sort K.K.); CHIMASSORB 2020FDL, TINUVIN 770DF, TINUVIN 152, TINUVIN 123, and FLAMESTAB NOR 116 FF (each trade name, manufactured by BASF Japan Ltd. (former Chiba Specialty Chemicals)); CYASORB UV-3346 and CYASORB UV-3529 (each trade name, manufactured by SUN CHEMICAL COMPANY LTD.).

Examples of the reductone include compounds exemplified in JP-A-6-27599, paragraph Nos. [0014] to [0034]; compounds exemplified in JP-A-6-110163, paragraph Nos. [0012] to [0020]; and compounds exemplified in JP-A-8-114899, paragraph Nos. [0022] to [0031].

In addition, it is possible to preferably use an oil-solubilized derivative of ascorbic acid and erythorbic acid, and examples include L-ascorbyl stearate, L-ascorbyl tetraisopalmitate, L-ascorbyl palmitate, erythorbyl palmitate, and erythorbyl tetraisopalmitate. Among them, those having an ascorbic acid skeleton are preferable, and myristate, palmitate, and stearate of L-ascorbic acid are particularly preferable.

The content of the radical scavenger in the cellulose acylate film is preferably from 0.001 to 2.0 parts by mass and more preferably from 0.01 to 1.0 part by mass, with respect to 100 parts by mass of the resin constituting the cellulose acylate film.

(Degradation Inhibitor)

To the cellulose acylate film, degradation inhibitors (for example, antioxidant, peroxide decomposer, radical inhibitor, metal-deactivator, acid scavenger, amine) may be added. Further, an ultraviolet absorber is one of the degradation inhibitors. These degradation inhibitors and the like are described in JP-A-60-235852, JP-A-3-199201, JP-A-5-1907073, JP-A-5-194789, JP-A-5-271471, JP-A-6-107854, JP-A-6-118233, JP-A-6-148430, JP-A-7-11056, JP-A-7-11055, JP-A-7-11056, JP-A-8-29619, JP-A-8-239509, and JP-A-2000-204173.

(Other Degradation Inhibitor)

As the other degradation inhibitor, it is possible to use an additive which is known as a peroxide decomposer, a radical inhibitor, or a metal deactivator. Examples thereof include compounds described in JP-A-2006-251746, paragraph Nos. [0074] to [0081] and [0082] to [0117].

(Peeling Agent)

Known peeling agent may be added to the cellulose acylate film of the present invention.

The peeling agent is preferably an organic acid, a polyvalent carboxylic acid derivative or a surfactant. For example, compounds described in JP-A-2006-45497, paragraph Nos. [0048] to [0081], compounds described in JP-A-2002-322294, paragraph Nos. [0077] to [0086], compounds described in JP-A-2012-72348, paragraph Nos. [0030] to [0056], and the like can be preferably used. The content of the peeling agent in the cellulose acylate film is preferably from 1 ppm to 5.0%, more preferably from 1 ppm to 2.0%, in terms of mass proportion.

The content of the degradation inhibitor in the cellulose acylate film is preferably from 1 ppm to 10%, more preferably from 10 ppm to 1.0%, in terms of mass proportion.

<Physical Properties of Cellulose Acylate Film>

(Hardness)

With regard to the surface hardness, the Knoop hardness by the Knoop method using a Knoop indenter is high and the pencil hardness is also favorable. The Knoop hardness can be obtained by a hardness tester with a Knoop indenter as the indenter, for example, the "FISCHERSCOPE H100Vp-type hardness tester" manufactured by Fischer Instruments K. K, referring to JIS Z2251:2009.

The pencil hardness can be evaluated, for example, by the pencil hardness evaluation method regulated in JIS K5400 using a test pencil regulated in JIS 56006.

(Elastic Modulus (Tensile Elastic Modulus))

The cellulose acylate film of the present invention exhibits practically-sufficient elastic modulus (tensile elastic modulus). The range of the elastic modulus, although it is not particularly limited, is preferably from 1.0 GPa to 7.0 GPa, and more preferably from 2.0 GPa to 6.5 GPa, from the viewpoint of production suitability and handling property. The chelating agents A and B of the present invention act such that the cellulose acylate film is hydrophobized by addition of the agents to a cellulose acylate, thereby improving elastic modulus. In this point, the present invention also has an advantage.

(Photoelastic Coefficient)

The absolute value of photoelastic coefficient of the cellulose acylate film of the present invention is preferably $8.0 \times 10^{-12}$ m$^2$/N or less, more preferably $6.0 \times 10^{-12}$ m$^2$/N or less, and still more preferably $5.0 \times 10^{-12}$ m$^2$/N or less. Lessening the photoelastic coefficient of the cellulose acylate film enables suppression of occurrence of unevenness under the conditions of high temperature and high humidity upon mounting of the optical film of the present invention including the cellulose acylate film into a liquid crystal display as a polarizing plate protective film. The photoelastic coefficient is measured and calculated in accordance with the following method, unless specified otherwise.

The lower limit of the photoelastic coefficient is not particularly limited. However, it is practical to be $0.1 \times 10^{-12}$ m$^2$/N or more.

A cellulose acylate film is cut into a specimen of 3.5 cm×12 cm and Re is measured under each load of non-load, 250 g, 500 g, 1,000 g and 1,500 g using an ellipsometer (M 150 [trade name], manufactured by JASCO Corporation), and by the slope of a straight line of Re change to stress, the photoelastic coefficient is calculated.

(Moisture Content)

The moisture content of the cellulose acylate film can be evaluated by measurement of equilibrium moisture content under the constant temperature and humidity. The equilibrium moisture content is obtained by the following method. That is, the moisture content of a sample which has reached equilibrium after leaving it for 24 hours at the above temperature and humidity is measured in accordance with Karl Fischer method, and the obtained moisture content (g) is divided by the sample mass (g) to obtain the equilibrium moisture content.

The moisture content of the cellulose acylate film of the present invention under the conditions of 25° C. and relative humidity of 80% is preferably 5% by mass or less, more preferably 4% by mass or less, and still more preferably less than 3% by mass. Lessening the moisture content of the cellulose acylate film enables suppression of occurrence of display unevenness of a liquid crystal display, under the conditions of high temperature and high humidity upon mounting of the optical film of the present invention including the cellulose acylate film into the liquid crystal display as a polarizing plate protective film. The lower limit of the moisture content is not particularly limited. However, it is practical to be 0.1% by mass or greater.

(Water-Vapor Transmission Ratio)

The water-vapor transmission ratio of the cellulose acylate film can be measured and evaluated by the following method. That is, the mass of water-vapor which passes through the sample for 24 hours in the atmosphere of temperature: 40° C. and relative humidity: 90% is measured in accordance with the water-vapor transmission ratio test (cup method) prescribed in JIS Z0208, and the thus-obtained value is converted to a value per m$^2$ of the sample area, to evaluate the water-vapor transmission ratio.

The water-vapor transmission ratio of the cellulose acylate film of the present invention is preferably from 500 to 2,000 g/m$^2$·day, more preferably from 900 to 1,300 g/m$^2$·day.

(Haze)

The cellulose acylate film preferably has a haze of 1% or less, more preferably 0.7% or less, even more preferably 0.5% or less. When the haze is lowered to the above-described upper limit or less, the cellulose acylate film has advantages in that transparency of the film is more increased and thus the film becomes more usable as an optical film. The haze is measured and calculated in accordance with the method used in Examples described below, unless specified otherwise. The lower limit of the haze is not particularly limited, but it is practical to be 0.001% or greater.

Haze of the film specimens of 40 mm×80 mm in size is measured in an environment at 25° C. and 60% relative humidity, using a haze meter (HGM-2DP, from Suga Test Instruments Co., Ltd.), according to JIS K7136.

(Film Thickness)

The average film thickness of the cellulose acylate film is preferably from 10 to 100 μm, more preferably from 15 to 80 μm, and still more preferably from 15 to 70 μm. Setting the average film thickness to 10 μm or greater is preferable, because handling property during production of a web film is improved. While, on the other hand, when the average film thickness is set to 100 μm or less, the response to humidity change becomes easy and thus maintenance of the optical characteristics becomes easy.

Further, in the case where the cellulose acylate film has a multi-layered structure of three or more multi-layers, the film thickness of the core layer is preferably from 3 to 70 μm, and more preferably from 5 to 60 μm, and each of the film thicknesses of the skin layer A and skin layer B is more preferably from 0.5 to 20 μm, particularly preferably from 0.5 to 10 μm, and most preferably from 0.5 to 3 μm.
(Width)

The film width of the cellulose acylate film is preferably from 700 to 3,000 mm, more preferably from 1,000 to 2,800 mm, and particularly preferably from 1,300 to 2,500 mm.
<Production Method of Cellulose Acylate Film>

The production method of the cellulose acylate film of the present invention is not particularly limited, but the cellulose acylate film is preferably produced by the melt film forming method or the solution film forming method. The production by the solution film forming method (i.e. a solvent-casting method) is more preferable. Examples of production of cellulose acylate film using a solvent-casting method are given in U.S. Pat. No. 2,336,310, U.S. Pat. No. 2,367,603, U.S. Pat. No. 2,492,078, U.S. Pat. No. 2,492,977, U.S. Pat. No. 2,492,978, U.S. Pat. No. 2,607,704, U.S. Pat. No. 2,739,069 and U.S. Pat. No. 2,739,070, British Patents 640731, 736892, JP-B-45-4554, JP-B-49-5614, and JP-A-60-176834, JP-A-60-203430, JP-A-62-115035, each of which is referred to. The cellulose acylate film may be stretched. Regarding the method and condition for stretching treatment, for example, referred to are JP-A-62-115035, JP-A-4-152125, JP-A-4-284211, JP-A-4-298310, and JP-A-11-48271.
(Casting Methods)

As the method of casting a solution, examples of the solution casting method (i.e. solvent-casting method) include: a method for uniformly extruding a prepared dope from a pressure die onto a metal support; a doctor blade method for adjusting, with a blade, the film thickness of a dope once cast onto a metal support; and a reverse roll coater method for adjusting it with a reverse rotating roll, but the method of using a pressure die is preferred. Examples of the pressure die include a coat hanger-type or a T die-type, and any of them may be preferably used. In addition to these methods exemplified herein, various methods of film production by casting a cellulose acylate solution, which are known in the art, may be employed. When each of conditions is set in consideration of the difference in the boiling points of solvents to be used, the same effects as the contents described in each publication can be obtained.

Co-Casting

In formation of the cellulose acylate film, a multi-layer casting method, such as a co-casting method, a sequential casting method, and a coating method, is preferable. Especially, a simultaneous co-casting method is particularly preferred, from the viewpoints of stable production and production cost.

Figure 3:
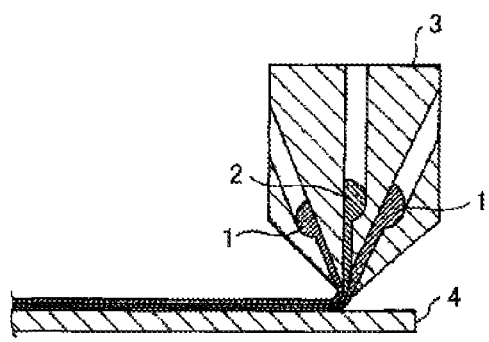
FIG. 3 is a schematic view showing an example in which casting of the cellulose acylate film having a three-layer structure is carried out by a simultaneous co-casting using a co-casting die.

In the case where the film is produced according to a co-casting method and a sequential casting method, first a cellulose acetate solution (dope) for each layer is prepared. The co-casting method (multilayer simultaneous casting method) is a casting method in which individual layers are simultaneously cast by simultaneously extruding co-casting dopes onto a casting support (band or dram) from a casting Giesser through which the individual casting dopes for intended layers (the number of the layers may be three or more) are simultaneously extruded via different slits, and then at a suitable time, the film formed on the support is peeled away and dried. In FIG. 3, the cross-sectional view shows a state in which casting is performed by simultaneously extruding three layers formed of a dope 1 for two surface layers and a dope 2 for core layer on a casting support 4, using a co-casting Giesser 3.

The sequential casting method is a casting method in which first a casting dope for first layer is extruded out and cast onto a casting support through a casting Giesser, then after it is dried or not dried, a casting dope for second layer is extruded through the casting Giesser and cast onto the first layer, and if needed, three or more layers are sequentially formed by casting and laminating dopes in the same manner as the above, and then at a suitable time, the resultant laminate is peeled away from the support and dried to form a cellulose acylate film. The coating method is generally a method in which a core layer is formed of film by means of film formation with solution, then a coating solution for a surface layer is prepared, and then using a suitable coater, the coating solution is applied onto the core layer first on one surface thereof and next on the other surface thereof, or simultaneously on both surfaces thereof, and dried to form a multi-layered cellulose acylate film.

As the endlessly running metal support for use in production of the cellulose acylate film, it is possible to use a dram the surface of which is mirror-finished by chromium plating, or a stainless belt (may be called as a band) the surface of which is mirror-finished by surface polish. One or at least two pressure dies may be used by arranging it or them above the metal support. Preferably, one or two pressure dies are arranged. In the case where two or more pressure dies are arranged, a casting amount of the dope may be divided into portions which are suitable for the individual dies; or the casting dope may be fed to the die at a suitable proportion from a plurality of precision metering gear pumps. The temperature of the dope (resin solution) to be used for casting is preferably from −10° C. to 55° C., and more preferably from 25° C. to 50° C. In this case, the solution temperature may be the same throughout the entire process, or may be different in different stages of the process. In the case where the temperatures are different in different stages, it is no problem as long as the dope has a desired temperature just before casting.

Further, the material of the above metal support, although it is not particularly limited, is preferably made of SUS (for example, SUS 316).
(Peeling)

The method of producing the cellulose acylate film preferably includes a process of peeling off the above dope film from the metal support. In the production method of the cellulose acylate film, the method of peeling off is not particularly limited, and peeling property can be improved by any of methods known for peeling-off.
(Stretching Process)

The method of producing the cellulose acylate film preferably includes a stretching process after film production. The stretching direction of the cellulose acylate film is preferable in any of a cellulose acylate film conveying direction (MD direction) and an orthogonal direction (TD direction) to the conveying direction. However, the orthogonal direction (TD direction) to cellulose acylate film conveying direction is particularly preferred from the viewpoint of the subsequent polarizing plate-manufacturing process using the cellulose acylate film.

A method of stretching the film in the TD direction is described, for example, in JP-A-62-115035, JP-A-4-152125, JP-A-4-284211, JP-A-4-298310, JP-A-11-48271, and the like. In the case of stretching in the MD direction, the cellulose acylate film is stretched when the cellulose acylate film winding speed is set to be faster than the cellulose acylate film peeling-off speed, for example, by adjusting a speed of the cellulose acylate film-conveying roller. In the case of stretching in the TD direction, the cellulose acylate film may be stretched by conveying the cellulose acylate film while holding the width of the cellulose acylate film with a tenter, and extending the width of the tenter gradually. After drying the cellulose acylate film, the film may be also stretched by using a stretching machine (preferably uniaxial stretching by using a long stretching machine).

In the case where the cellulose acylate film is used as a protective film for a polarizer, the transmission axis of the polarizer and the in-plane slow axis of the cellulose acylate film are required to be arranged parallel to one another, in order to suppress the light leakage when viewed from oblique directions to the polarizing plate. The transmission axis of the roll film-shaped polarizer that is produced continuously is generally parallel to the width direction of the roll film, and thus, in order to continuously sticking the above roll film-shaped polarizing element together with a protective film composed of the roll film-shaped cellulose acylate film, the in-plane slow axis of the roll film-shaped protective film is required to be parallel to the width direction of the cellulose acylate film. Accordingly, the film is preferably stretched to a larger extent in the TD direction. The stretching treatment may be conducted in the course of the film production process, or the original film obtained by rewinding the produced film may be subjected to a stretching treatment.

The stretching in the TD direction is preferably from 5 to 100%, more preferably from 5 to 80%, and particularly preferably from 5 to 40%. Meanwhile, non-stretching means that stretching is 0%. The stretching treatment may be conducted in the course of the film production process, or the original film obtained by rewinding the produced film may be subjected to a stretching treatment. In the former case, stretching may be conducted in the condition where a certain amount of a residual solvent is contained, and when the residual solvent amount, i.e. (mass of residual volatile substance/mass of film after heat treatment)×100(%), is from 0.05 to 50%, the stretching is preferably conducted. It is particularly preferable to conduct the stretching of from 5 to 80% in the condition where the residual solvent amount is from 0.05 to 5%.

(Drying)

It is preferable, from the viewpoint of enhancing the retardation, that the method of producing the cellulose acylate film includes a step of drying the cellulose acylate film and a step of stretching the thus-dried cellulose acylate film at a temperature which is equal to or higher than the glass transition temperature (Tg)−10° C.

Drying of the dope provided on the metal support that is included in the production of the cellulose acylate film, generally includes: a method of blowing a hot air from a surface side of the metal support (dram or belt), that is to say, from the surface of a web provided on the metal support; a method of blowing a hot air from a back side of the dram or belt; a back-side liquid heat transfer method in which a temperature-modulated liquid is brought into contact with the back side opposite to the casting side of the dram or belt, thereby heating the dram or belt through heat transfer to control a surface temperature; and the like. Among these, the back-side liquid heat transfer method is preferred. The surface temperature of the metal support before casting is conducted is not particularly limited as long as it is not higher than the boiling point of a solvent which is used for a dope. However, in order to accelerate drying or to make the dope lose fluidity on the metal support, the surface temperature is preferably set to a temperature which is lower by 1 to 10° C. than the boiling point of the solvent having the lowest boiling point among the solvents to be used for the dope. However, this shall not apply in the case where the casting dope is cooled and then peeled off without drying.

The adjustment of the cellulose acylate film thickness may be achieved by adjusting a concentration of the solid contained in the dope, a slit space of the die nozzle, an extrusion pressure from a die, a speed of the metal support, or the like, so as to be a desired thickness.

The thus-obtained cellulose acylate film is preferably wound at the degree of from 100 to 10,000 m, more preferably from 500 to 7,000 m, and still more preferably from 1,000 to 6,000 m, in length per roll. At the time of winding, at least one end thereof is preferably subjected to knurling. The width of knurling is preferably from 3 mm to 50 mm and more preferably from 5 mm to 30 mm. The height thereof is preferably from 0.5 µm to 500 µm and more preferably from 1 µm to 200 µm. This may be either one-way press or two-way press.

Since reduction in contrast and tingeing in an oblique direction generally become remarkable in the large screen displays, the above-described cellulose acylate film is especially suitable for use in such a large screen liquid crystal display. When the film is used as an optical compensation film for a large screen liquid crystal display, molding the film so as to be, for example, 1,470 mm or more in width is preferred. Further, the aspect of the polarizing plate protective film of the present invention includes a film piece that is cut to a size capable of being mounted as it is in a liquid crystal display, as well as a film that is manufactured in a long shape by continuous production and wound in a roll shape. The polarizing plate protective film of the latter aspect is stored or conveyed as it is, and is used by cutting to a desired size when the film is mounted in a liquid crystal display, or when the film and a polarizer or the like are stuck together in practice. Alternatively, the polarizing plate protective film is used by cutting to a desired size when the film is mounted in a liquid crystal display in practice after sticking the film in a long shape as it is with a polarizer composed of a polyvinyl alcohol film or the like manufactured similarly in a long shape. As an aspect of the optical compensation film which is wound in a roll shape, an aspect of a film which is wound in a roll shape and has a roll length of 2,500 m or more, is exemplified.

<<Functional Layer>>

In the cellulose acylate film of the present invention, functional layers for different purposes may be optionally disposed on the cellulose acylate film.

Examples of the functional layer include a hard coat layer, an antireflection layer, a light scattering layer, an antifouling layer, an antistatic layer, and the like. These layers providing a plurality of functions may be combined by one layer.

As an example, the hard coat layer is a layer for imparting hardness or scratch resistance to the optical film of the present invention. It is possible to form a hard coat layer exhibiting high adhesive property with respect to the cellulose acylate film in cooperation with the two kinds of chelating agents in the present invention, for example, by applying a coating composition on the cellulose acylate film and curing it. Filler and additive may be added to the hard coat layer, to thereby make the hard coat layer itself have additional mechanical, electrical or optical physical properties or chemical properties, such as water repellency or oil repellency. The thickness of the hard coat layer is preferably 0.1 to 6 µm, more preferably from 3 to 6 µm. Having such a thin hard coat layer of which the thickness falls within the range, the optical film can have improved physical properties in point of brittleness reduction and curling prevention and can attain other advantages of weight saving and production cost cutting.

Preferably, the hard coat layer is formed by curing a curable composition. Preferably, the curable composition is prepared as a liquid coating composition. One example of the coating composition contains a monomer or an oligomer for matrix formation binder, other polymer, and organic solvent. Curing the coating composition applied to the substrate film forms the intended hard coat layer. The curing reaction includes crosslinking or polymerization.

(Monomer or Oligomer for Matrix Formation Binder)

Examples of monomer or oligomer for matrix formation binder usable in the present invention include ionizing radiation-curable polyfunctional monomers and polyfunctional oligomers. The polyfunctional monomers and the polyfunctional oligomers are preferably crosslinkable or polymerizable ones. The functional group in the ionizing radiation-curable polyfunctional monomers and polyfunctional oligomers is preferably one polymerizable through exposure to light, electron beam or radiation; and above all, especially preferred is a photopolymerizing functional group.

Examples of the photopolymerizing functional group include unsaturated polymerizing functional group, such as a (meth)acryloyl group, a vinyl group, a styryl group, and an allyl group; a ring-opening polymerizing functional group, such as those in epoxy compounds. Above all, preferred is a (meth)acryloyl group.

Specific examples of the photopolymerizing polyfunctional monomer having a photopolymerizing functional group include: (meth)acrylic diesters of alkylene glycols, such as neopentylglycol acrylate, 1,6-hexanediol (meth)acrylate, and propyleneglycol di(meth)acrylate; (meth)acrylic diesters of polyoxyalkyleneglycols, such as triethyleneglycol di(meth)acrylate, dipropyleneglycol di(meth)acrylate, polyethyleneglycol di(meth)acrylate, and polypropyleneglycol di(meth)acrylate; (meth)acrylic diesters of polyalcohols, such as pentaerythritol di(meth)acrylate; (meth)acrylic diesters of ethylene oxide or propylene oxide adducts, such as 2,2-bis {4-(acryloxy.diethoxy)phenyl}propane, and 2,2-bis{4-(acryloxy.polypropoxy)phenyl}propane.

Further, urethane (meth)acrylates, polyester (meth)acrylates, isocyanuric acrylates, and epoxy (meth)acrylates are also preferred, for use as the photopolymerizing polyfunctional monomer.

Of the above, more preferred are esters of polyalcohols and (meth)acrylic acids, and even more preferred are polyfunctional monomers having at least three (meth)acryloyl groups in one molecule.

Specific examples thereof include (di)pentaerythritol tri(meth)acrylate, (di)pentaerythritol tetra(meth)acrylate, (di)pentaerythritol penta(meth)acrylate, (di)pentaerythritol hexa(meth)acrylate, tripentaerythritol triacrylate, tripentaerythritol hexaacrylate, trimethylolpropane tri(meth)acrylate, trimethylolethane tri(meth)acrylate, ditrimethylolpropane tetra(meth)acrylate, EO-modified trimethylolpropane tri(meth)acrylate, PO-modified trimethylolpropane tri(meth)acrylate, EO-modified phosphoric acid tri(meth)acrylate, 1,2,4-cyclohexane tetra(meth)acrylate, pentaglycerol triacrylate, 1,2,3-cyclohexane tetramethacrylate, polyester polyacrylate, and caprolactone-modified tris(acryloxyethyl)isocyanurate.

In this description, "(meth)acrylate", "(meth)acrylic acid" and "(meth)acryloyl" mean "acrylate or methacrylate", "acrylic acid or methacrylic acid" and "acryloyl or methacryloyl", respectively.

Further, examples include resins having at least 3 (meth)acryloyl groups, for example, polyester resins having a relatively low molecular weight, as well as polyether resins, acrylic resins, epoxy resins, urethane resins, alkyd resins, spiroacetal resins, polybutadiene resins, polythiol polyene resins, oligomers or prepolymers of polyfunctional compounds, such as polyalcohols.

As concrete compounds of the polyfunctional acrylate-based compounds having at least 3 (meth)acryloyl groups, referred to is the description in JP-A-2007-256844, paragraph No. [0096], and the like.

As urethane (meth)acrylates, for example, there may be mentioned urethane (meth)acrylate-based compounds obtained by reacting a hydroxy group-containing compound, such as alcohol, polyol and/or hydroxy group-containing (meth)acrylate, with an isocyanate, followed by optionally esterifying the polyurethane compound obtained through the reaction with (meth)acrylic acid.

As specific examples of those compounds, referred to is the description in JP-A-2007-256844, [0017], and the like.

Use of isocyanuric (meth)acrylates is preferred as reducing the curling of the formed film. Isocyanuric acrylates include isocyanuric diacrylates and isocyanuric triacrylates; and as examples of those compounds, referred to is the description in JP-A-2007-256844, [0018] to [0021], and the like.

An epoxy-based compound may further be used in the hard coat layer for reducing the shrinkage of the layer through curing. As the epoxy group-having monomers for constituting the epoxy compound, usable are monomers having at least 2 epoxy groups in one molecule. Examples of those monomers include epoxy-based monomers described in JP-A-2004-264563, JP-A-2004-264564, JP-A-2005-37737, JP-A-2005-37738, JP-A-2005-140862, JP-A-2005-140863, and JP-A-2002-322430. Also preferred is use of compounds having both epoxy and acrylic functional groups, such as glycidyl (meth)acrylate.

(Polymer Compound)

The hard coat layer may contain a polymer compound. Adding a polymer compound to the layer is preferred, as capable of reducing the curing shrinkage of the layer and capable of facilitating the viscosity control of the coating liquid that takes an interest in the dispersion stability (coagulability) of resin particles. Other advantages of the polymer compound are that the polarity of the solidified matter in the drying step may be controlled to change the coagulation behavior of resin particles and that the drying unevenness in the drying step can be reduced.

The polymer compound is already in the form of a polymer when it is added to the coating liquid. As the polymer compound of the type, preferred for use are, for example, cellulose esters (e.g., cellulose triacetate, cellulose diacetate, cellulose propionate, cellulose acetate propionate, cellulose acetate butyrate, and cellulose nitrate); and resins, such as urethanes, polyesters, (meth)acrylates (e.g., methyl methacrylate/methyl (meth)acrylate copolymer, methyl methacrylate/ethyl (meth)acrylate copolymer, methyl methacrylate/butyl (meth)acrylate copolymer, methyl methacrylate/styrene copolymer, methyl methacrylate/(meth)acrylic acid copolymer, and poly(methyl methacrylate)); and polystyrenes.

(Curable Composition)

One example of the curable composition usable for forming the hard coat layer is a curable composition containing a (meth)acrylate-based compound. Preferably, the curable composition contains a photoradical polymerization initiator or a thermal radical polymerization initiator, along with the (meth)acrylate-based compound, and if desired, may further contain a filler, a coating aid, and any of other additives. The curable composition may be cured through polymerization to be attained by exposure to ionizing radiation or to heat, in the presence of the photoradical polymerization initiator or the thermal radical polymerization initiator. Ionizing radiation curing and thermal curing may be combined. As the photoradical and thermal radical polymerization initiators, usable are commercial products, which are described in, for example, "Newest UV Curing Technology", p. 159 (issued by Kazuhiro Takausu, published by Technical Information Society of Japan, 1991), and Ciba Specialty Chemicals' catalogues.

Another example of the curable composition that can be used in forming the hard coat layer is a curable composition containing an epoxy-based compound. Preferably, the curable composition of the type contains an optical acid generator capable of generating a cation by the action of light applied thereto, along with the epoxy-based compound therein, and may optionally contain a filler, a coating aid, and any of other additives. The curable composition may be cured through polymerization to be attained by exposure to light, in the presence of an optical acid generator. Examples of the optical acid generator include ionic compounds, such as triarylsulfonium salts, diaryliodonium salts; and nonionic compounds, such as sulfonic acid nitrobenzyl ester. Various types of known optical acid generators, such as the compounds described "Imaging Organic Material" (edited by Organic Electronics Material Society of Japan, published by Bunshin Publishing, 1997).

A (meth)acrylate-based compound and an epoxy-based compound may be combined for use. In such a case, preferably, a photoradical polymerization initiator or a thermal radical polymerization initiator is combined with an optical cationic polymerization initiator, as the polymerization initiator.

The curable composition which is particularly suitable for the formation of the hard coat layer is a composition containing a (meth)acrylate-based compound, as used in Examples to be described below.

The curable composition is preferably prepared as a coating liquid. The coating liquid can be prepared, by dissolving and/or dispersing the above-mentioned ingredients in an organic solvent.

(Property of Hard Coat Layer)

In particular, having at least two or more chelating agents of the present invention which have different pKa, the hard coat layer formed on the cellulose acylate film of the present invention exhibits high adhesive property with respect to the cellulose acylate film.

It is preferable that the hard coat layer is excellent in abrasion resistance. Concretely, when the layer is tested in a pencil hardness test (JIS 56006) that is an index of abrasion resistance, the layer attains at least 3H.

[Polarizing Plate]

The polarizing plate of the present invention has at least a polarizer and a cellulose acylate film of the present invention. The polarizing plate of the present invention preferably has a polarizer and the cellulose acylate film of the present invention provided on one side or both sides of the polarizer. Examples of the polarizer include an iodine-based polarizer, a dye-based polarizer using a dichroic dye, and a polyene-based polarizer. Ordinarily the iodine-based polarizer and the dye-based polarizer may be produced, with using a polyvinyl alcohol-based film. When the cellulose acylate film of the present invention is used as a polarizing plate protective film, the production method of the polarizing plate is not particularly limited and may be produced in accordance with an ordinary manner. For example, there is a method of subjecting the cellulose acylate film of the present invention to an alkali treatment, and besides preparing a polarizer by immersing a polyvinyl alcohol film in an iodine solution and stretching the film, and then sticking the thus-treated cellulose acylate film and both sides of the polarizer together with a completely-saponified polyvinyl alcohol solution. In place of the alkali treatment, an easy adhesion processing as described in JP-A-6-94915 and JP-A-6-118232 may be used. Examples of the adhesive that is used for sticking the processed surface of the cellulose acylate film and both sides of the polarizer together include polyvinyl alcohol-based adhesives, such as polyvinyl alcohol, and polyvinyl butyral, and vinyl-based latexes derived from, such as butyl acrylate.

The cellulose acylate film of the present invention and the polarizer are preferably stuck together such that a transmission axis of the polarizer and a slow axis of the cellulose acylate film of the present invention are substantially bisected at right angles. It is preferable that a transmission axis of the polarizer and a slow axis of the cellulose acylate film of the present invention in the liquid crystal display of the present invention are stuck together so as to be substantially bisected at a right angle each other. Herein, the expression "substantially bisected at right angle" means that the direction of principal refractive index nx of the cellulose acylate film of the present invention and the direction of the transmission axis of the polarizer are crossed at the angle of 90°±10°, and they are crossed preferably at the angle of 90°±5° and more preferably at the angle of 90°±1°. Setting the angle to the above range enables further reduction in light leakage under the condition of polarizing plate cross nicol. The measurement of the slow axis can be performed by various known methods and can be performed, for example, using a birefringence meter (KOBRA DH, manufactured by Oji Scientific Instruments).

The aspect of the polarizing plate of the present invention includes a film piece that is cut to a size capable of being mounted as it is in a liquid crystal display, as well as a film that is manufactured in a long shape by continuous production and wound in a roll shape (for example, an aspect having the roll length of 2,500 m or longer and an aspect having the roll length of 3,900 m or longer). When intended for the large-screen liquid crystal display, the width of the polarizing plate is preferably set to 1,470 mm or longer. The specific configuration of the polarizing plate of the present invention is not particularly limited, and known configuration may be used. For example, the configuration shown in FIG. 6 of JP-A-2008-262161 may be used.

<<Display>>

The present invention is used preferably for application to a display, using the polarizer.

Examples of such an application to a display include an antireflection usage of a liquid crystal display or an organic electroluminescent display.

Explaining the liquid crystal display as an example, the liquid crystal display of the present invention has at least a liquid crystal cell and the polarizing plate of the present invention. In the liquid crystal display of the present invention, in the case where the liquid crystal display has the polarizing plate, a first polarizing plate, and a second polarizing plate, which are described below, the liquid crystal display is preferably an IPS, OCB, or VA mode in which at least either of the first or second polarizing plate is the polarizing plate of the present invention.

The liquid crystal display of the present invention preferably has a liquid crystal cell, and a polarizing plate which is layered on the respective side of the liquid crystal cell and equipped with an optical film on the surface of the side opposite to the liquid crystal cell side. In other words, it is preferable that the liquid crystal display of the present invention has the first polarizing plate, the liquid crystal cell, and the second polarizing plate, and is equipped with the cellulose acylate film of the present invention on the surface opposite to the polarizing plate surface sandwiched between the respective polarizing plate and the liquid crystal cell. The liquid crystal display having such a configuration is excellent in suppression of display unevenness and exerts high display performance.

In addition, the liquid crystal display of the present invention preferably has an optical film, particularly a cellulose acylate film in which the polarizing plate disposed on the visual recognition side has a hard coat layer on the surface of the optical film on the visual recognition side. The liquid crystal display having such a configuration exerts excellent excoriation resistance and light resistance in addition to high display performance excellent in suppression of display unevenness.

Figure 2:
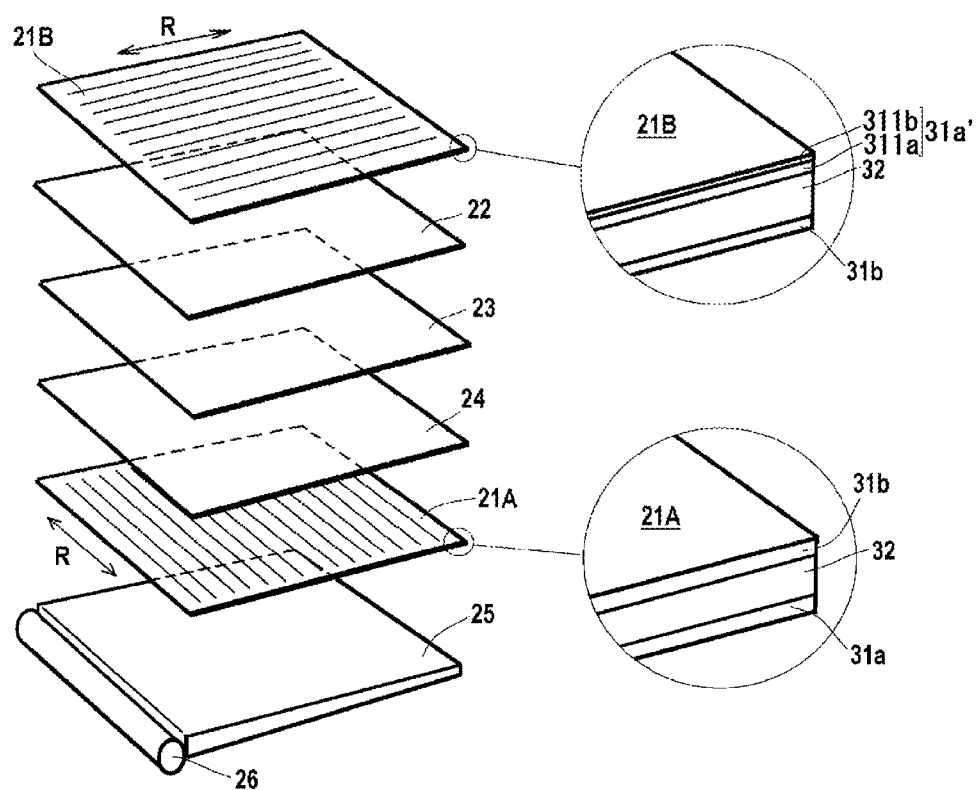
FIG. 2 is another example of an exploded perspective view diagrammatically showing an internal structure of the liquid crystal display.

As the liquid crystal display of the present invention, an internal configuration of a typical liquid crystal display is shown in FIG. 1 and FIG. 2. In FIG. 1, a liquid crystal display having polarizing plates 21A and 21B in which optical films 31a and 31b of the present invention composed of a cellulose acylate film are disposed on both surfaces of a polarizer 32 is illustrated. In addition, in FIG. 2, a liquid crystal display equipped with an optical film 31a' in which a polarizing plate 21B disposed on the visual recognition side has a hard coat layer 311b on the surface on the visual recognition side of the polarizer 32 via a cellulose acylate film 311a is illustrated.

The configuration of an example of the liquid crystal display of the present invention is illustrated in FIG. 1 and FIG. 2, but the specific configuration of the liquid crystal display of the present invention is not particularly limited, and a known configuration can be adopted. Further, the configuration shown in FIG. 2 of JP-A-2008-262161 may be preferably used.

The present invention will be described in more detail based on the following examples, but the invention is not intended to be limited thereto.

EXAMPLES

Example 1

In the following manner, the cellulose acylate film was obtained.

(Preparation of Cellulose Acylate Solution 101)

The following composition was poured into a mixing tank, and each of components was dissolved by stirring, to prepare a cellulose acylate solution 101.

| Composition of cellulose acylate solution 101 | |
| --- | --- |
| Cellulose acetate (acetyl substitution degree 2.87, Mn 163,000, Mw 365,000) | 100.0 parts by mass |
| Ester oligomer A, in which the number-average molecular weight is 800 | 10.0 parts by mass |
| Ultraviolet absorber B | 2.7 parts by mass |
| Methylene chloride (first solvent) | 389.0 parts by mass |
| Methanol (second solvent) | 58.2 parts by mass |

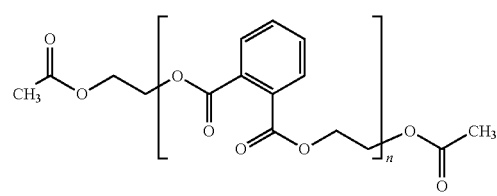

Ester oligomer A

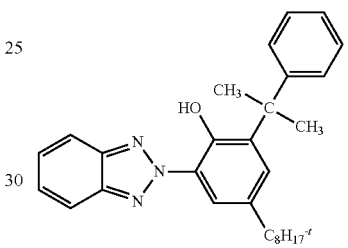

Ultraviolet absorber B (Preparation of Matting Agent Solution 102)

The following composition was poured into a dispersing machine, and each of components was dissolved by stirring, to prepare a matting agent solution 102.

| Composition of matting agent solution 102 | |
| --- | --- |
| Silica particles having an average particle size of 20 nm (AEROSIL R972, manufactured by Nippon Aerosil Co., Ltd) | 2.0 parts by mass |
| Methylene chloride (first solvent) | 75.5 parts by mass |
| Methanol (second solvent) | 11.3 parts by mass |
| The cellulose acylate solution 101 | 0.9 parts by mass |

(Preparation of Chelating Agent Solution 103)

The following composition was poured into a mixing tank, followed by dissolving the ingredients by stirring while heating, to prepare a chelating agent solution 103.

| Composition of chelating agent solution 103 | |
| --- | --- |
| Following additive C | 19.0 parts by mass |
| TINUVIN123 manufactured by BASF Japan Ltd. | 0.86 parts by mass |
| Chelating agent A | |
| PP-061, manufactured by Nippon Shokubai Co., Ltd. | 75.5 parts by mass |

Composition of chelating agent solution 103

| Chelating agent B | |
|---|---|
| PH-450, manufactured by CHELEST CORPORATION | 0.015 parts by mass |
| Methylene chloride (first solvent) | 69.6 parts by mass |
| Methanol (second solvent) | 10.4 parts by mass |

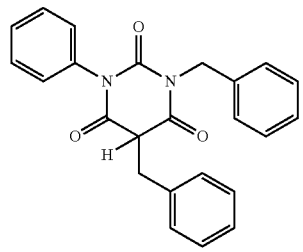 [SMILES: O=C1C(Cc2ccccc2)C(=O)N(c2ccccc2)C(=O)N1Cc1ccccc1]

Additive C

<Casting>

1.3 parts by mass of the matting agent solution 102 and 3.4 parts by mass of the chelating agent solution 103 were each filtered and then mixed by using an in-line mixer, and 95.3 parts by mass of the cellulose acylate solution 101 was added thereto, and the mixture was mixed by using an in-line mixer. A band casting device was used to cast the thus-prepared dope on a casting support made of stainless steel (support temperature 22° C.). The film was peeled off in a state where the amount of the remaining solvent in the dope was 10% by mass to 40% by mass, followed by drying while being stretched by 1.15 times (15%) at a temperature of 120° C. in the width direction, in a state where the amount of the remaining solvent was 5% by mass to 30% by mass while gripping both ends of the film in the width direction with a tenter. After that, the film was further dried by letting it transport between rolls of the heat treatment apparatus, to prepare the cellulose acylate film No. 101 of the present invention. The thickness of the thus-obtained cellulose acylate film was 40 μm.

The cellulose acylate films of Nos. 102 to 112 of the present invention and the cellulose acylate films of Nos. c01 and c04 for comparison were produced in the same manner as the cellulose acylate film of No. 101, except that the kind and the addition amount of chelating agents added to the chelating agent solution were changed to those shown in Table 1.

Herein, of the chelating agents used in Table 1, the compounds described by trade names or abbreviation are as follows.

(Chelating Agent A)

PH-540 (trade name: manufactured by CHELEST CORPORATION, Ethylenediamine N,N,N',N'-tetrakis(methylenephosphonic acid)

Techrun DO (trade name: manufactured by Nagase ChemteX Corporation, diethylenetriaminepentaacetic acid)

(Chelating Agent B)

EPOMIN PP-061 (trade name: manufactured by NIPPON SHOKUBAI CO., LTD., N-hydroxypropylpolyethyleneimine, the average molecular weight of approximately 1,400)

In Table 1, shown as 'PP-061'.

Chelating Agent D

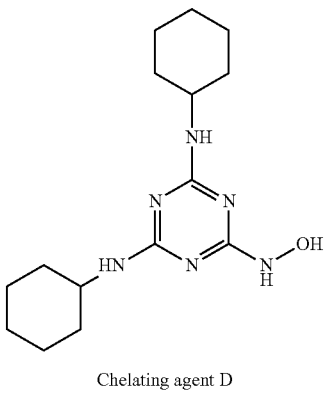 [SMILES: ONc1nc(NC2CCCCC2)nc(NC2CCCCC2)n1]

Chelating agent D

With respect to the cellulose acylate films of Nos. 102 to 112 of the present invention and the cellulose acylate films of Nos. c01 to c04 for comparison, each of which was prepared as described above, the following performance evaluation was conducted.

(Measurement of the Number of Bright Spots)

The number of bright spots per $cm^2$ was measured, by arranging two sheets of polarizing plates in a cross-nicol alignment, inserting the thus-prepared cellulose acylate film between them, and observing the thus-sandwiched product under a polarizing microscope (objective lens×50 times).

The polarizing plate was produced in the following manner.

A polarizing film was prepared, by adsorbing iodine onto a stretched polyvinyl alcohol. A commercially available cellulose acetate film (FUJITAC TD80UF, manufactured by FUJIFILM Corporation, (Re=0, Rth=40 nm)) was subjected to a saponification treatment. Then, the saponified cellulose acetate film was stacked with a polyvinyl alcohol-based adhesive on both sides of the above-prepared polarizer, to prepare a polarizing plate.

(Change of Film Thickness Due to Heat and Humidity Aging)

Each of the thus-prepared cellulose acylate films was cut into 4-cm squares, and this was subjected to humidity conditioning under the environment of temperature 25° C. and relative humidity 60% for 2 hours, and then a film thickness was measured.

Then, the above cellulose acylate film was put into a 500 ml-volumetric SUS316 container, and subjected to humidity conditioning at temperature of 85° C. and relative humidity of 97% for 2 hours, and then a lid of the container was closed. Further, the cellulose acylate film was stored at 85° C. and relative humidity of 97% for 350 hours. Then, the cellulose acylate film was taken out from the container, and after humidity conditioning under the environment of temperature 25° C. and relative humidity 60% for 2 hours, a film thickness was measured, to calculate the rate of change in the film thickness, in accordance with the following formula.

(The rate of change in film thickness)={(The film thickness before aging at 85° C. and 97%)−(The film thickness after aging at 85° C. and 97%)}/(The film thickness before aging at 85° C. and 97%)

The obtained results are shown together in Table 1.

TABLE 1

| Film No. | Chelating agent A Kind | Chelating agent A pKa of acidic group | Chelating agent A Addition amount* | Chelating agent B Kind | Chelating agent B pKa of basic group | Chelating agent B Addition amount* | The number of bright spots | The rate of change in film thickness after 85° C., 97%, and 350 hr | Remarks |
|---|---|---|---|---|---|---|---|---|---|
| 101 | Manufactured by Chelest PH-540 | Less than 3 | 0.0032 | Manufactured by NIPPON SHOKUBAI EPOMINE PP-061 | 13.0 | 0.024 | 450 | Less than 5% | This invention |
| 102 | Manufactured by Chelest PH-540 | Less than 3 | 0.0032 | Manufactured by NIPPON SHOKUBAI EPOMINE PP-061 | 13.0 | 0.040 | 410 | Less than 5% | This invention |
| 103 | Manufactured by Chelest PH-540 | Less than 3 | 0.0032 | Manufactured by NIPPON SHOKUBAI EPOMINE PP-061 | 13.0 | 0.080 | 380 | Less than 5% | This invention |
| 104 | Manufactured by Chelest PH-540 | Less than 3 | 0.0060 | Manufactured by NIPPON SHOKUBAI EPOMINE PP-061 | 13.0 | 0.080 | 340 | Less than 5% | This invention |
| 105 | Manufactured by Chelest PH-540 | Less than 3 | 0.0120 | Manufactured by NIPPON SHOKUBAI EPOMINE PP-061 | 13.0 | 0.080 | 300 | Less than 5% | This invention |
| 106 | Manufactured by Chelest diethylenetriaminepentaacetic acid | 3.6 | 0.0200 | Manufactured by NIPPON SHOKUBAI EPOMINE PP-061 | 13.0 | 0.040 | 290 | Less than 5% | This invention |
| 107 | Manufactured by Chelest diethylenetriaminepentaacetic acid | 3.6 | 0.0200 | Manufactured by Tokyo Chemical Industry N,N,N',N'',N''-pentakis(2-hydroxypropyl) diethylenetriamine | 8.4 | 0.04 | 300 | Less than 5% | This invention |
| 108 | Manufactured by Chelest diethylenetriaminepentaacetic acid | 3.6 | 0.0200 | Chelating agent D | 14.0 | 0.02 | 330 | Less than 5% | This invention |
| 109 | Manufactured by Chelest diethylenetriaminepentaacetic acid | 3.6 | 0.0200 | Manufactured by Tokyo Chemical Industry triethylenetetramine | 8.9 | 0.01 | 290 | Less than 5% | This invention |
| 110 | Manufactured by Watanabe Chemical L-ascorbic acid palmitic acid ester | 6.0 | 0.2 | Manufactured by Tokyo Chemical Industry N,N,N',N'',N''-pentakis(2-hydroxypropyl) diethylenetriamine | 8.4 | 0.024 | 490 | Less than 5% | This invention |
| 111 | Manufactured by Watanabe Chemical L-ascorbic acid palmitic acid ester | 6.0 | 0.05 | Manufactured by Tokyo Chemical Industry N,N,N',N'',N''-pentakis(2-hydroxypropyl) diethylenetriamine | 8.4 | 0.024 | 495 | Less than 5% | This invention |
| 112 | Manufactured by Nagase ChemteX Technun DO | 3.6 | 0.02 | Manufactured by NIPPON SHOKUBAI EPOMINE PP-061 | 13.0 | 0.024 | 370 | Less than 5% | This invention |
| c01 | None | — | — | None | — | — | 560 | Less than 5% | Comparative example |
| c02 | Manufactured by Chelest PH-540 | Less than 3 | 0.0032 | None | — | — | 610 | 20% | Comparative example |
| c03 | None | — | — | Manufactured by NIPPON SHOKUBAI EPOMINE PP-061 | 13.0 | 0.024 | 540 | Less than 5% | Comparative example |
| c04 | Manufactured by Chelest diethylenetriaminepentaacetic acid (Exemplified compound in JP-A-2013-25013) | 3.6 | 0.0050 | None | — | — | 680 | 30% | Comparative example |

*The addition amounts to 100 parts by mass of cellulose acylate.

From the results in Table 1, it is understood that each of the cellulose acylate films of the present invention is preferable, in terms of less in the number of bright spots and excellent in durability under high temperature and high humidity.

As a result, it is possible to produce a liquid crystal display exhibiting excellent performance as described above, by using the polarizing plate of the present invention.

REFERENCE SIGNS LIST

1 Dope for two surface layers
2 Dope for core layer (base layer)
3 Co-casting Giesser
4 Casting support
21A, 21B Polarizing plate
22 Color filter substrate
23 Liquid crystal layer
24 Array substrate
25 Light guide plate
26 Light source
31a, 31a', 31b Cellulose acylate film (Polarizing plate protective film)
311a Cellulose acylate film
311b Hard coat layer
32 Polarizer
R Polarization direction

The invention claimed is:

1. A cellulose acylate film, comprising:
at least two or more of chelating agents having different pKa values from one another,
wherein the chelating agents comprise:
a chelating agent A having at least one functional group whose acid dissociation constant pKa, measured at 25° C. in a mixed solvent having a mixing ratio of tetrahydrofuran 60 ml/water 40 ml, is 6 or less; and
a chelating agent B having at least one functional group of a conjugate acid whose pKa, measured at the same condition, is 7 or more; and
a cellulose acylate, and
wherein the number of bright spots of the cellulose acylate film is equal to or less than 500/cm$^2$, and
wherein the chelating agent A comprises at least a phosphonic acid or its salt as a functional group, or the chelating agent A comprises at least 2 of the same functional groups selected from the group consisting of a phosphonic acid group, a carboxylic acid group and a sulfonic acid group.

2. The cellulose acylate film according to claim 1, wherein the chelating agent B contains a functional group selected from an amino group and an imino group.

3. The polarizing plate protective film, comprising:
the cellulose acylate film according to claim 1.

4. The polarizing plate, comprising:
at the polarizing plate protective film according to claim 3; and
a polarizer.

5. The liquid crystal display, comprising:
at the polarizing plate according to claim 4; and
a liquid crystal cell.

6. The cellulose acylate film according to claim 1, wherein the total acetyl substitution degree of the cellulose acylate is from 2.70 to 2.95.

7. The cellulose acylate film according to claim 1, wherein the number of functional groups in the molecule of the chelating agent B is from 0.80 to 1.20 times with respect to the number of functional groups whose pKa is 6 or less in the molecule of the chelating agent A.

8. The cellulose acylate film according to claim 1, wherein the chelating agent A and the chelating agent B are contained in combination with a barbituric acid compound represented by the following Formula (BA):

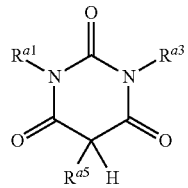

Formula (BA)

wherein, in formula (BA), $R^{a1}$, $R^{a3}$ and $R^{a5}$ each independently represent a hydrogen atom, an alkyl group having 1 to 20 carbon atoms, a cycloalkyl group having 3 to 20 carbon atoms, an alkenyl group having 2 to 20 carbon atoms, or an aryl group having 6 to 20 carbon atoms; and the alkyl group, the cycloalkyl group, the alkenyl group, and the aryl group may have a substituent.

9. The cellulose acylate film according to claim 8, wherein the content of the barbituric acid compound is 0.1 to 20 parts by mass with respect to 100 parts by mass of the cellulose acylate.

* * * * *